US006910728B2

(12) United States Patent
Seo

(10) Patent No.: US 6,910,728 B2
(45) Date of Patent: Jun. 28, 2005

(54) DOOR HINGE MOUNTING STRUCTURE FOR VEHICLES

(75) Inventor: Kyung-Dug Seo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/749,242

(22) Filed: Dec. 30, 2003

(65) Prior Publication Data

US 2005/0057070 A1 Mar. 17, 2005

(30) Foreign Application Priority Data

Sep. 16, 2003 (KR) ........................ 10-2003-0064215

(51) Int. Cl.⁷ .................................................. B50J 5/00
(52) U.S. Cl. ........................... 296/146.11; 296/146.12; 16/382
(58) Field of Search ................. 296/146.11, 146.6, 296/146.5, 146.8, 146.7, 187.12, 202; 411/353, 411/352, 337; 49/502, 501; 16/382, 334

(56) References Cited

U.S. PATENT DOCUMENTS

| | | | | |
|---|---|---|---|---|
| 4,720,895 A | * | 1/1988 | Peebles ........................ 16/382 |
| 4,864,687 A | * | 9/1989 | Calcaterra et al. ............ 16/334 |
| 4,908,908 A | * | 3/1990 | Mitsuoka et al. ...... 296/146.11 |
| 5,029,364 A | * | 7/1991 | Salazar ........................ 16/382 |
| 5,208,943 A | * | 5/1993 | Dubach et al. ............... 16/382 |
| 5,335,533 A | * | 8/1994 | Rehus ......................... 74/422 |
| 5,632,065 A | * | 5/1997 | Siladke et al. ............... 16/335 |
| 5,694,719 A | * | 12/1997 | Bejune et al. ................ 49/502 |
| 5,842,735 A | * | 12/1998 | Makino et al. ........ 296/146.11 |
| 6,073,308 A | * | 6/2000 | Linnenbrink et al. ......... 16/334 |
| 6,086,143 A | * | 7/2000 | Schroeder et al. ..... 296/146.11 |
| 6,231,112 B1 | * | 5/2001 | Fukumoto et al. ....... 296/146.5 |
| 6,490,759 B1 | * | 12/2002 | Brueckner et al. ............ 16/342 |
| 6,568,741 B1 | * | 5/2003 | Leung et al. .......... 296/146.11 |
| 6,808,223 B1 | * | 10/2004 | Baum et al. ........... 296/146.12 |

FOREIGN PATENT DOCUMENTS

EP 0-425 919 A1 10/1990
EP 1 111 251 A1 11/2000

\* cited by examiner

*Primary Examiner*—Kiran Patel
(74) *Attorney, Agent, or Firm*—Morgan Lewis & Bockius LLP

(57) ABSTRACT

A door hinge mounting structure for vehicles comprises a bracket having a closed cross-section. A coupling nut is coupled to the bracket via a plurality of flanges and a coupling bolt. The coupling bolt also has a guide portion, such that an easy assembly allows a door hinge to be securely and stably coupled to a door, thereby reducing maintenance of the door hinge assembly and providing a firm support for the door to the vehicle body.

7 Claims, 3 Drawing Sheets

DOOR HINGE MOUNTING STRUCTURE FOR VEHICLES

CROSS-REFERENCE TO RELATED APPLICATIONS

This application claims priority to Korean Application No. 10-2003-0064215, filed on Sep. 16, 2003, the disclosure of which is incorporated fully herein by reference.

FIELD OF THE INVENTION

The present invention generally relates to a vehicle door hinge mounting structure. More particularly, the structure includes a technique for obtaining a sufficiently rigid door hinge relative to the door.

BACKGROUND OF THE INVENTION

Typically, a door hinge for a vehicle door should be able to sustain the weight of the door and securely support the door to the vehicle body. The door hinge typically must also withstand excessive openings and closings. Therefore, to provide a strong and rigid coupling between the door and the door hinge the structure of the brackets and the placements of the bolts and nuts for mounting the door to the door hinge is critical.

SUMMARY OF THE INVENTION

According to an embodiment of the present invention a vehicle door hinge mounting structure securely couples a door hinge to a door and obtains an easy assembly and maintenance structure. Furthermore, the door is securely coupled to a vehicle body in a stable and secure mounting state.

In accordance with a preferred embodiment of the present invention, a door hinge mounting structure for vehicles comprises a bracket having generally opposed inner and outer plates. The door hinge also has a cross-section perpendicular to the two plates forming a closed cross-section while the inner plate is coupled to a support panel in a surface-contact state. A coupling nut connects the two inner and outer plates of the bracket and has processed threads therein. A coupling bolt penetrates the inner and outer plates of the bracket, one after another, by passing through a door hinge and the support panel to thereafter be coupled to the coupling nut.

BRIEF DESCRIPTION OF THE DRAWINGS

For a fuller understanding of the nature and objects of the present invention, reference should be made to the following detailed description taken in conjunction with the accompanying drawings in which.

DETAILED DESCRIPTION OF A PREFERRED EMBODIMENT

Figure 1:
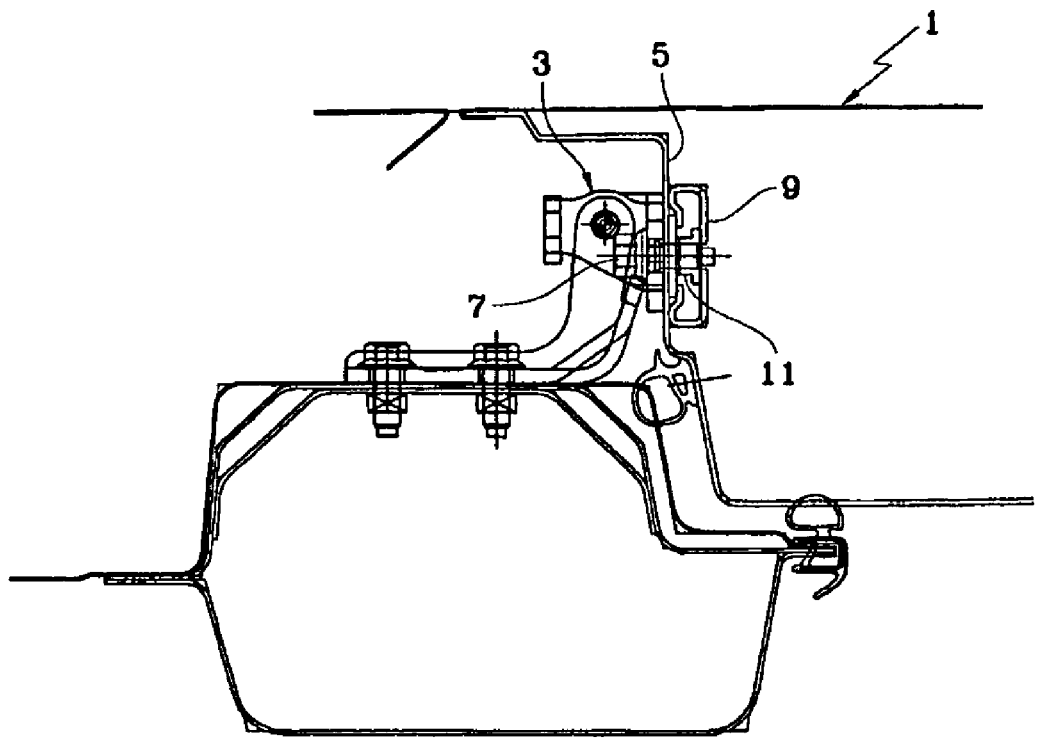
FIG. 1 is a cross-sectional view of a door hinge mounting structure for vehicles according to an embodiment of the present invention.
Figure 2:
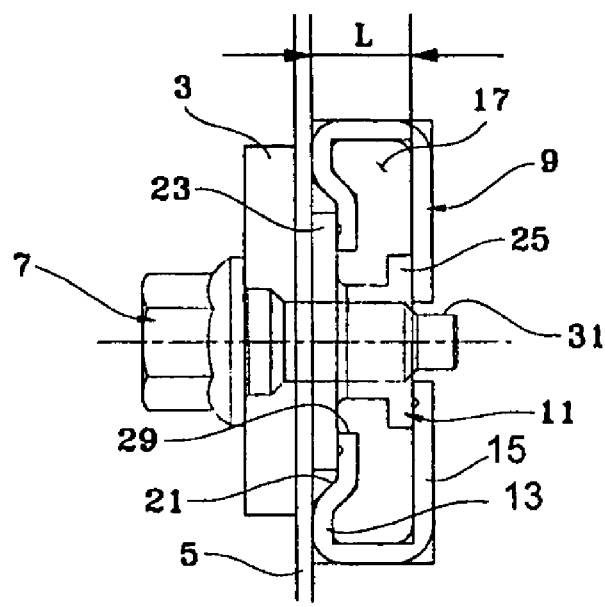
FIG. 2 is a detailed view of principal parts of FIG. 1.

As depicted in FIGS. 1 and 2, a door 1 is rotatably coupled to a vehicle body through a door hinge 3. The door hinge 3 is secured on one side to the door 1 and fixed on the other side to the vehicle body. The structure of the door hinge 3 is described in further detail in FIG. 2. According to FIG. 2, a door inner panel 5 is used as a support panel for the mounting of the door hinge 3. In mounting the door to the door inner panel 5, a door hinge 3 is attached to the door inner panel 5 by way of a coupling bolt 7 being received by a coupling nut 11 and a bracket 9.

Figure 3:
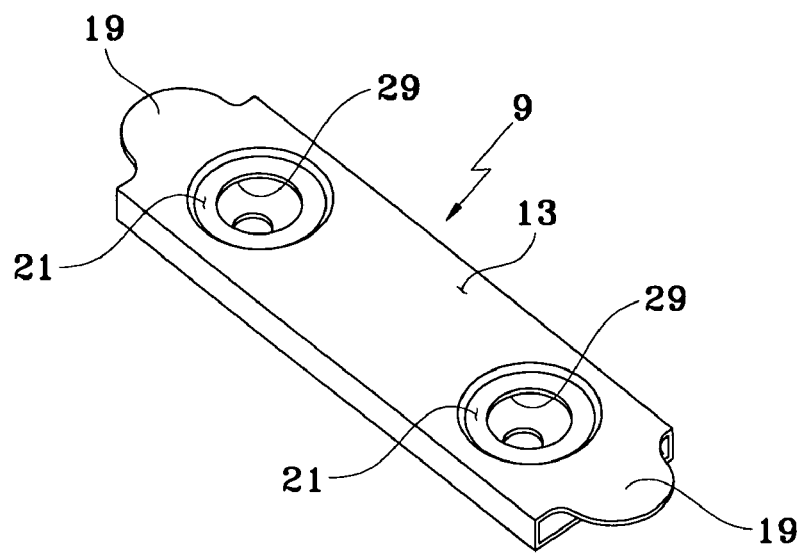
FIG. 3 is perspective view of a bracket according to an embodiment of the present invention.
Figure 4:
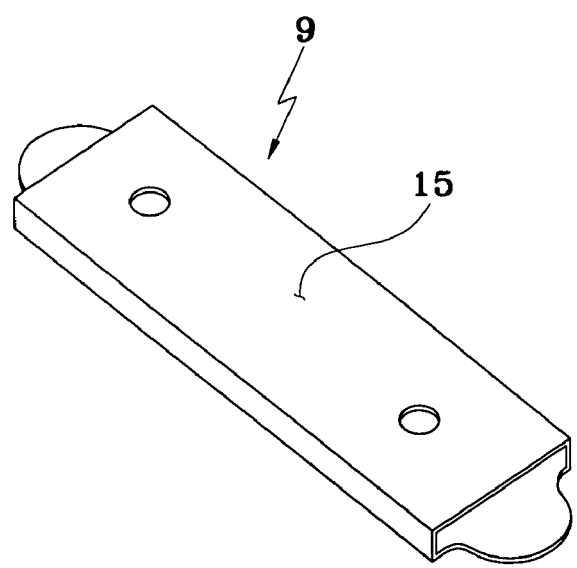
FIG. 4 is a schematic drawing of the bracket of FIG. 3 shown in an opposite direction.

As illustrated in FIGS. 3 and 4, the bracket 9 includes inner and outer generally opposing plates 13 and 15, respectively. A cross-section of bracket 9 taken perpendicular to the two plates 13 and 15 forms a closed cross-section 17 (FIG. 2). The inner plate 13 is coupled to the door inner panel 5 such that the surfaces come into contact.

The inner plate 13 of bracket 9 includes a welding part 19 (FIG. 3), or tab, for coupling inner plate 13 to the support panel. The welding part 19 generally extends from the inner plate 13 and has a shape or tab that protrudes from the inner plate 13. A recess portion 21 is disposed at an inner side of the bracket 9 where the coupling bolt 7 penetrates the inner plate 13. The coupling nut 11 is so formed as to connect the inner plate 13 and outer plate 15 of the bracket 9. Threads can be included on the coupling nut 11 for coupling, however, any suitable coupling mechanism is appropriate.

Figure 5:
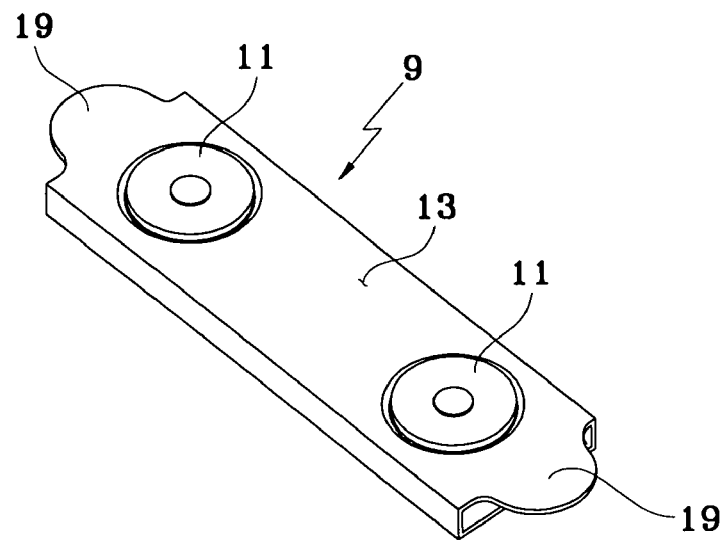
FIG. 5 is a perspective view of a structure of a coupling nut according to an embodiment of the present invention.
Figure 6:
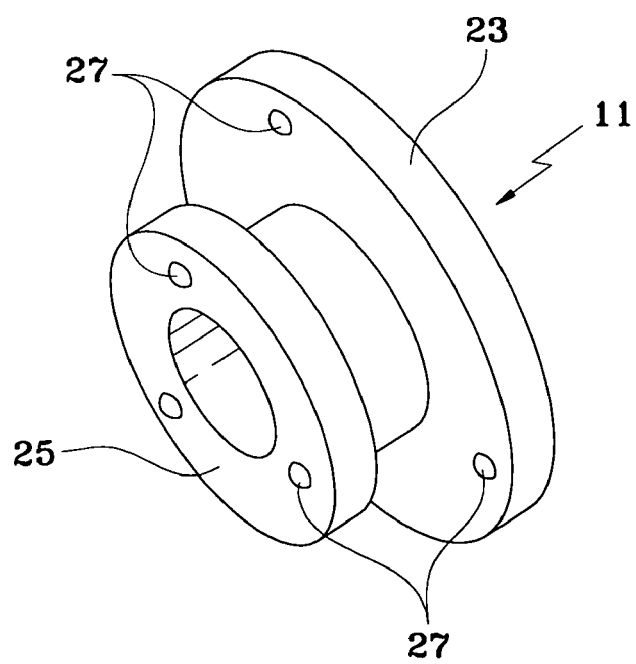
FIG. 6 is a perspective view of a coupling state of a bracket and a coupling nut according to an embodiment of the present invention.

As shown in FIGS. 3, 5, and 6, the coupling nut 11 is mounted with a first flange 23 that generally fills up the recess portion 21. A second flange 25 is coupled to an inner side of the bracket 9 of the outer plate 15. The first flange 23 and second flange 25 can be welded to the coupling nut 11 or attached thereto by any suitable coupling mechanism. A hole 29 is disposed at the recess portion 21 of the inner plate 13. The hole 29 is larger than the diameter of the second flange 25. Therefore, the second flange 25 can easily pass through the inner plate 13 to come into contact with an inner surface of the outer plate 15. According to a preferred embodiment the first and second flanges 23 and 25, respectively, are configured with a plurality of welding protruders 27 (FIG. 6) that provide for coupling by welding. FIG. 6 shows the coupling nut 11 welded to the bracket 9. First, the coupling nut 11 is integrated with the bracket 9 as shown in FIG. 6 then the door inner panel 5 of support panel is welded to the welding part 19 of the bracket 9.

The coupling bolt 7 passes through the door hinge 3 and the support panel and couples with the coupling nut 11. The coupling bolt 7 in turn penetrates the inner and outer plates 13 and 15, respectively, of the bracket 9. According to a preferred embodiment, the coupling bolt 7 is not equipped with threads at a distal tip end thereof, such that an easy assembly with the coupling nut 11 is facilitated. The coupling bolt 7 is also mounted with a guide portion 31 (FIG. 2) whose diameter is smaller than inner diameter of the coupling nut 11. As a result, a coupling operation of the door hinge 3 can be easily carried out, and such problems as threads being abraded due to an odd entry angle of the coupling bolt 7 can be obviated at the initial coupling stage of the coupling nut 7.

The coupling bolt 7 and the coupling nut 11 are mutually connected to form a sufficient length of an "L," as shown in FIG. 2 and also to obtain the closed cross-section 17, as shown in FIG. 2. This configuration provides a rigidity to the door hinge 3 such that the coupled structure of the door hinge 3 can sustain a weight of the door 1 securely and stably and can resist shocks generated when the door 1 is opened excessively and/or slammed closed. The door hinge 3 is assembled when the door hinge 3 is abutted to the door inner panel 5 and the coupling bolt 7 while the door inner panel 5 is welded to the bracket 9.

In the present embodiment, although the support panel refers to the door inner panel 5, it should be noted that the structure of the present invention can be applied to a portion where the door hinge 3 is coupled to the vehicle body such that the support panel may be the vehicle body panel.

As apparent from the foregoing, there is an advantage in the vehicle door hinge mounting structure thus described in that an easy assembly allows a door hinge to be securely and stably coupled to a door, thereby enabling a preserved maintenance of the door and a firm support for the door to a vehicle body.

What is claimed is:

1. A door hinge mounting structure for vehicles comprises
   a bracket having generally opposed inner and outer plates, and a cross-section perpendicular to said two plates forming a closed cross-section while said inner plate is coupled to a support panel in a surface-contact state;
   a coupling nut for connecting said two inner and outer plates of said bracket and having processed threads therein; and
   a coupling bolt for penetrating said inner and outer plates of said bracket one after another by passing through a door hinge and said support panel to thereafter be coupled to said coupling nut.

2. The structure as defined in claim 1, wherein said bracket is formed with a recess portion at a surrounding area where said coupling bolt penetrates said inner plate, and said coupling nut is provided with a first flange welded to and filling up said recess portion, and a second flange welded to an inner side of said outer plate.

3. The structure as defined in claim 2, wherein said inner plate is a protruding welding portion extended from said inner plate for being welded to said support panel.

4. The structure as defined in claim 2, wherein a hole is formed at said recess portion of said inner plate and is larger than a diameter of said second flange.

5. The structure as defined in claim 2, wherein said first and second flanges nut are respectively provided with a plurality of welding protruders for welding.

6. The structure as defined in claim 2, wherein said coupling nut is provided at an end thereof with a guide whose diameter is smaller than inner diameter of said coupling nut in order to facilitate an easy assembly with the coupling nut.

7. The structure as defined in claim 1, wherein the support panel is composed of a door inner panel.

* * * * *